United States Patent
Hunt (10) Patent No.: US 9,861,183 B2
(45) Date of Patent: Jan. 9, 2018

(54) EQUIPMENT CARRIER WITH EXTENSIBLE TETHER

(71) Applicant: FeraDyne Outdoors, LLC, Superior, WI (US)

(72) Inventor: Fred H. Hunt, Duluth, MN (US)

(73) Assignee: FeraDyne Outdoors, LLC, Superior, WI (US)

( * ) Notice: Subject to any disclaimer, the term of this patent is extended or adjusted under 35 U.S.C. 154(b) by 79 days.

(21) Appl. No.: 14/938,555

(22) Filed: Nov. 11, 2015

(65) Prior Publication Data

US 2016/0058166 A1    Mar. 3, 2016

Related U.S. Application Data

(63) Continuation of application No. 13/180,549, filed on Jul. 12, 2011, now Pat. No. 9,210,978.

(51) Int. Cl.
| | |
|---|---|
| *A45F 3/04* | (2006.01) |
| *A45F 5/00* | (2006.01) |
| *A45C 11/38* | (2006.01) |
| *A45C 11/08* | (2006.01) |
| *A44B 17/00* | (2006.01) |
| *A44B 18/00* | (2006.01) |
| *F16B 1/00* | (2006.01) |
| *A45F 3/14* | (2006.01) |

(52) U.S. Cl.
CPC .............. *A45F 5/004* (2013.01); *A44B 17/00* (2013.01); *A44B 18/00* (2013.01); *A45C 11/08* (2013.01); *A45C 11/38* (2013.01); *A45F 3/04* (2013.01); *A45F 3/047* (2013.01); *A45F 5/00* (2013.01); *F16B 1/00* (2013.01); *A45F 2003/045* (2013.01); *A45F 2003/146* (2013.01); *A45F 2005/006* (2013.01); *F16B 2001/0035* (2013.01)

(58) Field of Classification Search
CPC . A45C 11/08; A45C 11/38; A45F 2200/0533; A45F 2003/045
USPC ....... 224/162, 242, 262, 254, 908, 909, 268, 224/458, 651; 248/693, 610; 396/420, 396/423, 425
See application file for complete search history.

(56) References Cited

U.S. PATENT DOCUMENTS

| | | | | |
|---|---|---|---|---|
| 2,643,803 A | * | 6/1953 | Bates | A45F 5/00 119/857 |
| 3,307,757 A | * | 3/1967 | Gatos | G02B 23/18 224/629 |
| 3,357,613 A | * | 12/1967 | Chase | A45F 3/14 224/162 |
| 3,547,323 A | | 12/1970 | Sledge, Jr. | |
| 3,782,614 A | | 1/1974 | Campisi | |
| 4,328,917 A | | 5/1982 | Reeberg | |

(Continued)

*Primary Examiner* — Adam Waggenspack
(74) *Attorney, Agent, or Firm* — Winthrop & Weinstine, P.A.

(57) ABSTRACT

An equipment carrier comprises one or more support members, an equipment holder, and an extensible tether. The equipment holder receives and retains an equipment item. The support members support the equipment holder against a wearer's torso or limb. The extensible tether is attached to the carrier is attached to the equipment item. The extensible tether is under tension and elongated when the equipment item retained by the equipment holder, and is under negligible tension and not elongated the equipment item held by the wearer at the wearer's face or head.

19 Claims, 9 Drawing Sheets

(56) References Cited

U.S. PATENT DOCUMENTS

| | | | | |
|---|---|---|---|---|
| 4,486,169 | A | * | 12/1984 | Lewis ............... F23Q 2/34 |
| | | | | 206/85 |
| 4,714,184 | A | * | 12/1987 | Young ............... A45C 11/38 |
| | | | | 224/185 |
| 5,016,797 | A | * | 5/1991 | Rowledge ........... A45F 5/00 |
| | | | | 224/257 |
| 5,172,838 | A | | 12/1992 | Rowell et al. |
| 5,323,942 | A | * | 6/1994 | Dahan ............... A45C 11/38 |
| | | | | 224/639 |
| 5,524,749 | A | | 6/1996 | Thompson et al. |
| 5,632,428 | A | | 5/1997 | Weiss |
| 6,471,054 | B2 | | 10/2002 | Nevarez |
| 6,926,184 | B2 | | 8/2005 | Hancock et al. |
| 7,036,943 | B1 | * | 5/2006 | Brewer ............. A45F 5/00 |
| | | | | 224/637 |
| 7,059,503 | B2 | | 6/2006 | Andersen |
| 2003/0029895 | A1 | | 2/2003 | Andersen |
| 2004/0140335 | A1 | | 7/2004 | Hancock et al. |
| 2004/0206792 | A1 | * | 10/2004 | Mineer ............. A45C 11/38 |
| | | | | 224/259 |
| 2006/0151563 | A1 | | 7/2006 | Bussard |
| 2007/0152007 | A1 | | 7/2007 | Kauss et al. |
| 2010/0052931 | A1 | | 3/2010 | Kolpasky et al. |
| 2010/0171021 | A1 | * | 7/2010 | Smith .............. A45C 13/30 |
| | | | | 248/558 |
| 2010/0206922 | A1 | * | 8/2010 | Gross .............. A45F 5/004 |
| | | | | 224/162 |
| 2012/0125956 | A1 | * | 5/2012 | Maeda ............. A45C 7/0054 |
| | | | | 224/101 |
| 2012/0168472 | A1 | * | 7/2012 | Mathews ........... A45F 3/14 |
| | | | | 224/162 |

\* cited by examiner

EQUIPMENT CARRIER WITH EXTENSIBLE TETHER

CROSS-REFERENCE TO RELATED APPLICATIONS

This application is a continuation, and claims the benefit under 35 U.S.C. §120, of U.S. patent application Ser. No. 13/180,549, filed Jul. 12, 2011, which is herein incorporated by reference in its entirety.

BACKGROUND

The field of the present invention relates to equipment carriers. In particular, an equipment carrier is disclosed herein that includes an elastic tether.

A wide variety of carriers for binoculars, cameras, and other equipment have been developed previously. Some of these are disclosed in:
- U.S. Pat. No. 3,307,757 entitled "Binocular carrier" issued Mar. 7, 1967 to Gatos et al;
- U.S. Pat. No. 3,782,614 entitled "Binocular pocket" issued Jan. 1, 1974 to Campisi;
- U.S. Pat. No. 5,016,797 entitled "Article carrier" issued May 21, 1991 to Rowledge;
- U.S. Pat. No. 5,172,838 entitled "Chest pouch camera carrier" issued Dec. 22, 1992 to Rowell et al;
- U.S. Pat. No. 5,323,942 entitled "Photographic equipment pack" issued Jun. 28, 1994 to Dahan;
- U.S. Pat. No. 6,471,054 entitled "Soft-sided sports bag for carrying outdoor sports and activities accessories" issued Oct. 29, 2002 to Nevarez;
- U.S. Pat. No. 6,926,184 entitled "Suspended article cover hold down system" issued Aug. 9, 2005 to Hancock et al;
- U.S. Pat. No. 7,059,503 entitled "Device for restraining and protecting neckstrap-supported user equipment" issued Jun. 13, 2006 to Andersen;
- U. S. Pat. Pub. No. 2006/0151563 entitled "Wearable device-securing system" published Jul. 13, 2006 in the name of Bussard; and
- U. S. Pat. Pub. No. 2007/0152007 entitled "Modular pack system" published Jul. 5, 2007 in the names of Kauss et al.

SUMMARY

An equipment carrier comprises one or more support members, an equipment holder, and an extensible tether. The equipment holder is arranged to receive and retain an equipment item. The one or more support members are arranged to support the equipment holder against a wearer's torso or limb. The extensible tether is attached to at least one of the support members and is arranged to be attached to the equipment item.

The equipment holder, the one or more support members, and the tether are arranged so that, with (i) the one or more support members supporting the equipment holder against the wearer's torso or limb, (ii) the tether attached to the equipment item, and (iii) the equipment item retained by the equipment holder, the extensible tether is under tension and elongated substantially beyond its rest length. The one or more support members and the tether are arranged so that, with (i) the one or more support members supporting the equipment holder against the wearer's torso or limb, (ii) the tether attached to the equipment item, and (iii) the equipment item held by the wearer at the wearer's face or head, the extensible tether is under negligible tension and not elongated substantially beyond its rest length.

Objects and advantages pertaining to equipment carriers may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

Figure 1:
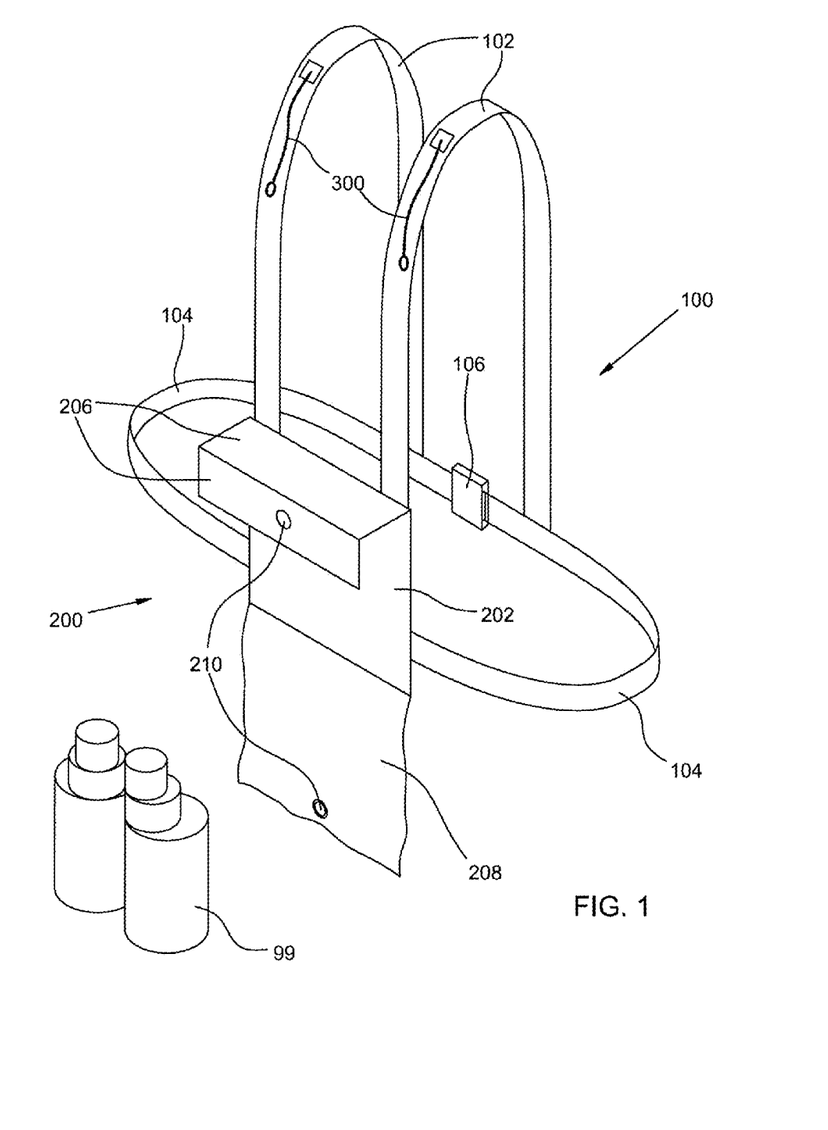
FIGS. 1, 2, and 3 illustrate schematically an equipment carrier according to the present disclosure.
Figure 2:
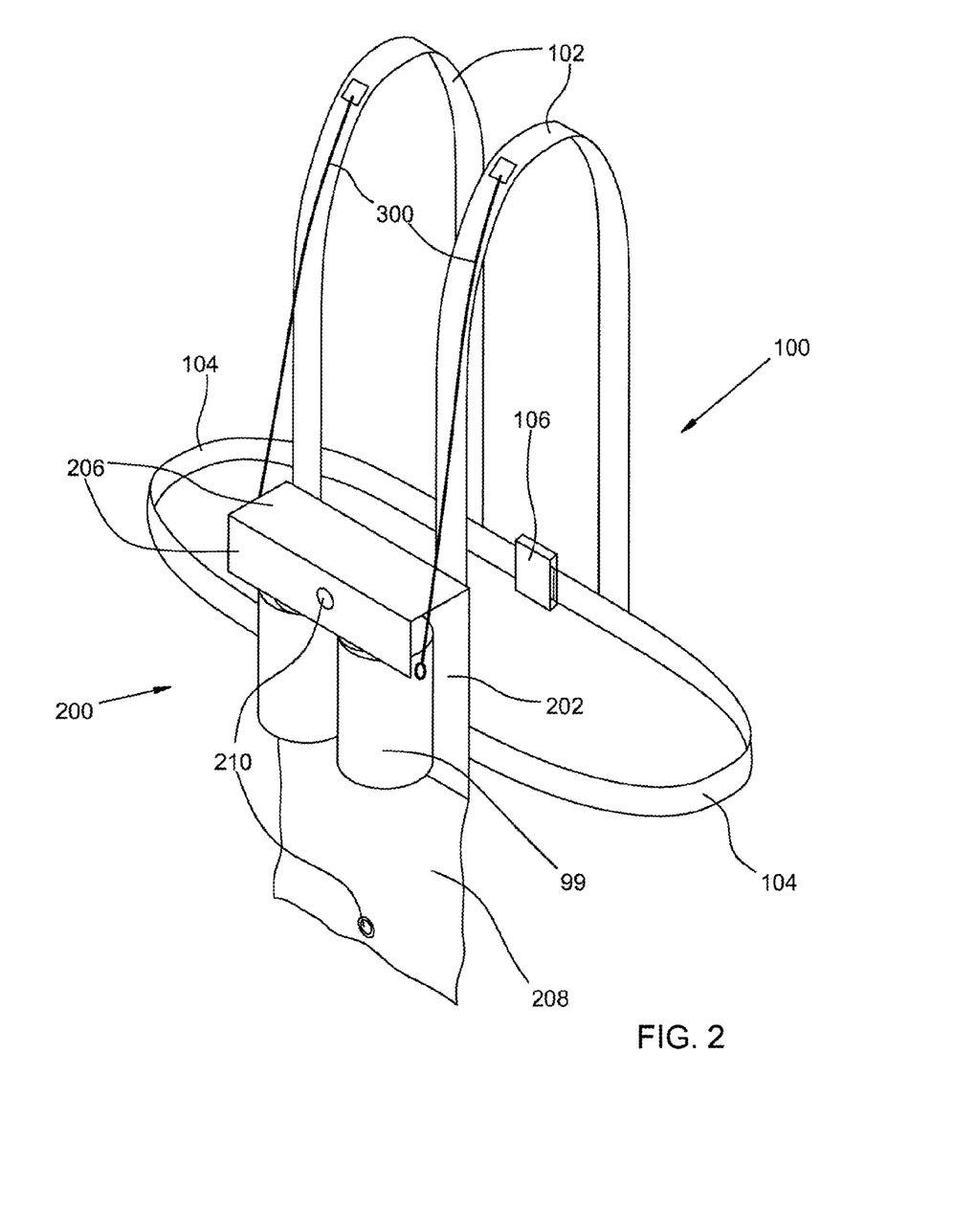
Figure 3:
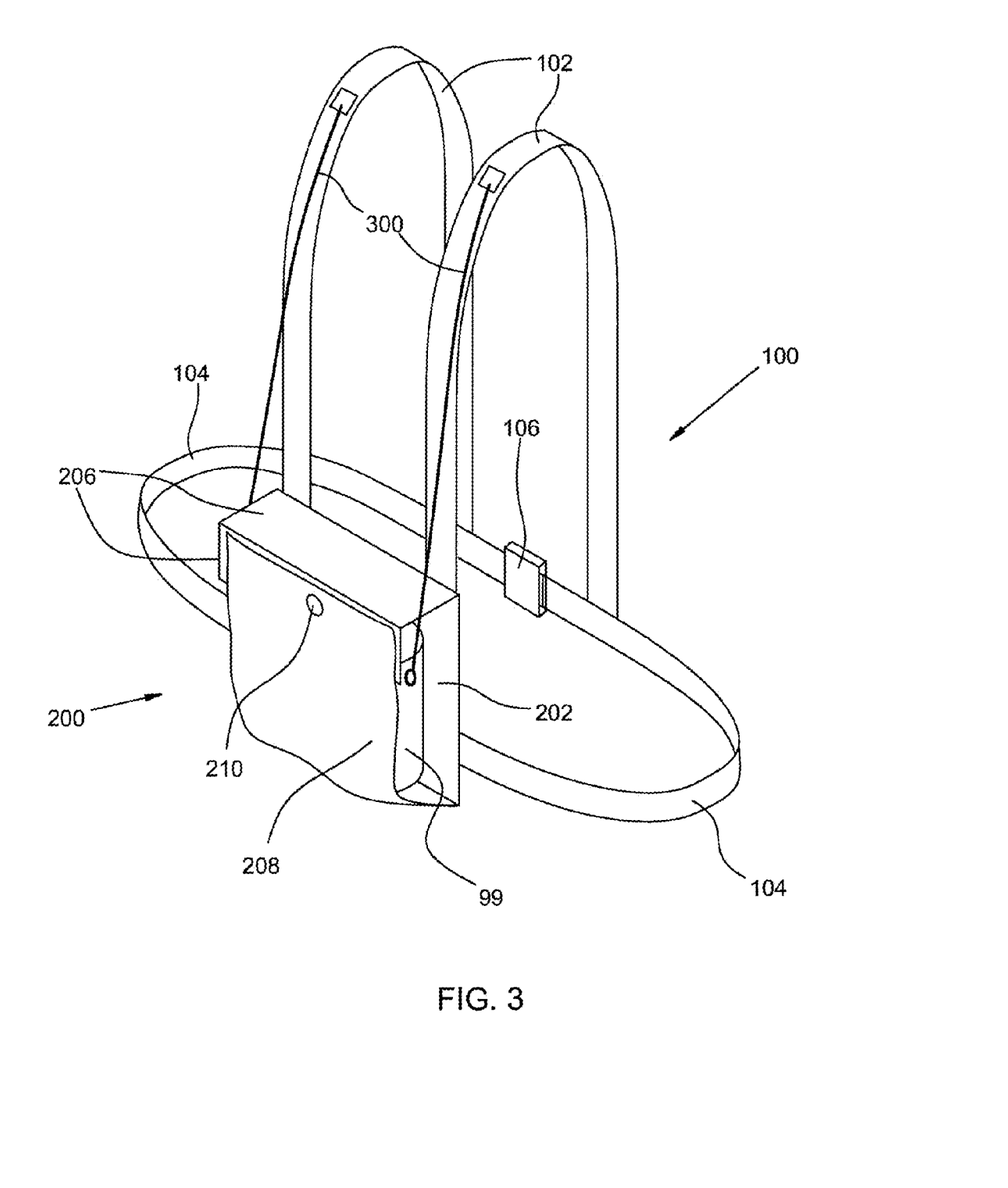

In one example of an equipment carrier as schematically illustrated in FIGS. 1-3, a set 100 of support members includes a pair of shoulder straps 102, a waist strap 104, and a buckle 106. Any suitable materials can be employed (e.g., nylon or canvas), in any suitable arrangement (e.g., using ties, buckles, or other closures; including different or additional straps). An equipment holder 200 is attached to one or more of the straps 102/104 so as to be supported against a wearer's chest or belly, within easy reach. More generally, the equipment holder 200 can be held by a set 100 of support members at any convenient or suitable position against the wearer's torso or limb. The position of the equipment holder 200 (e.g., its height) can be fixed or adjustable on the support members 100; if adjustable, adjustment can be (i) through adjustment of strap lengths or (ii) by a point of attachment to the support members that is movable along one or more of the straps. One or more extensible tethers 300 are attached to one or more of the support members (e.g., shoulder straps 102) or to the holder 200 and are arranged to be attached to an equipment item 99 (e.g., a pair of binoculars, a laser rangefinder, a camera, or other equipment item). A pair of tethers 300 are shown in FIGS. 1-5; any necessary, suitable, or desirable number of one or more tethers can be employed. Instead of a dedicated set of straps 102/104, the equipment holder 200 can be attached to a typical backpack, a safety vest or utility vest, a utility belt, a safety harness, a hydration pack with a bladder, or other garments or equipment that can be worn by a wearer.

The equipment holder 200 comprises a back panel 202 and a top front panel 206, and can further include a flexible bottom front panel 208. The flexible bottom front panel 208 is attached to a lower portion of back panel 202 and can fold upward to be releasably attached to the top front panel 206. The equipment holder 200 can be sized to accommodate the equipment item 99 between the various panels of the equipment holder 200 with the bottom front panel 208 folded upward and attached to top front panel 206. Any equipment item 99 desired to be kept within easy reach can be held within equipment holder 200, such as a pair of binoculars, a laser rangefinder, a camera, or some other piece of equipment.

The back panel 202 and top front panel 206 preferably form a substantially rigid bracket that nevertheless exhibits a small degree of elastic deformability. The bracket can be arranged to provide an interference fit when the equipment item 99 is inserted between panel 202 and a front portion of panel 206, and the deformability enables the bracket to accommodate the equipment item 99 and helps to retain it in the equipment holder 200.

Figure 6:
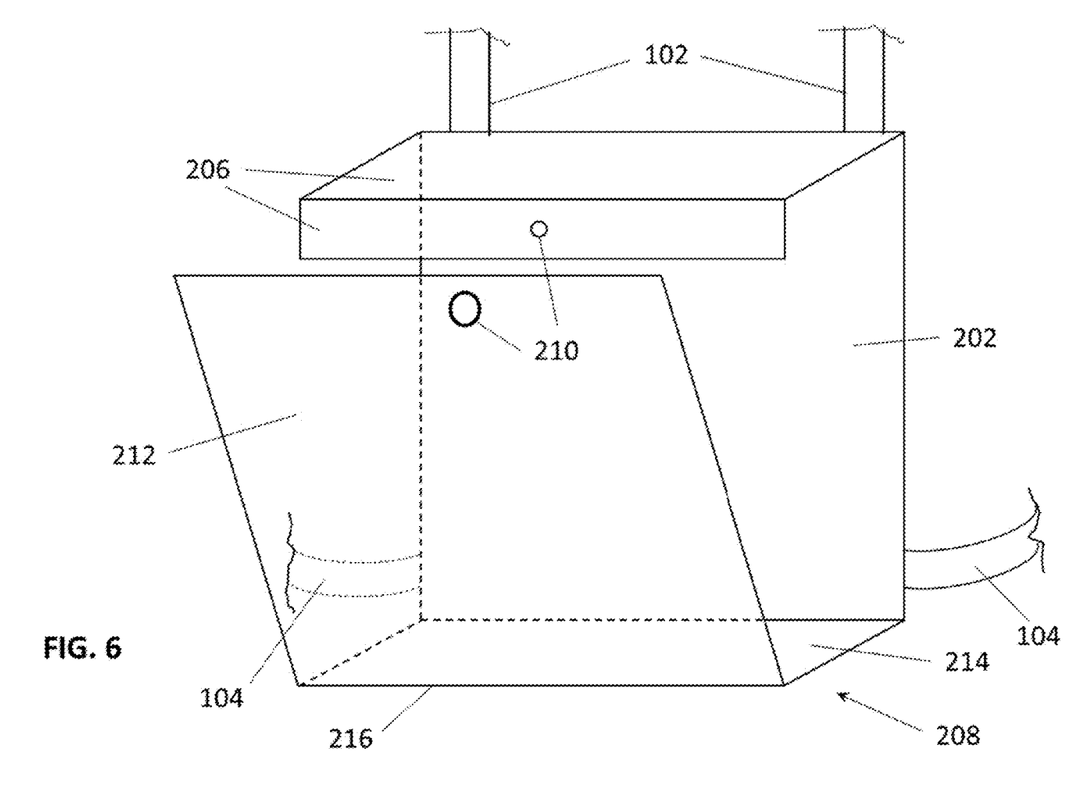
FIG. 6 illustrates a non-limiting exemplary embodiment of an equipment holder having a flexible bottom front panel with multiple substantially rigid segments connected by one or more flexible joints.
Figures 7A, 7D:
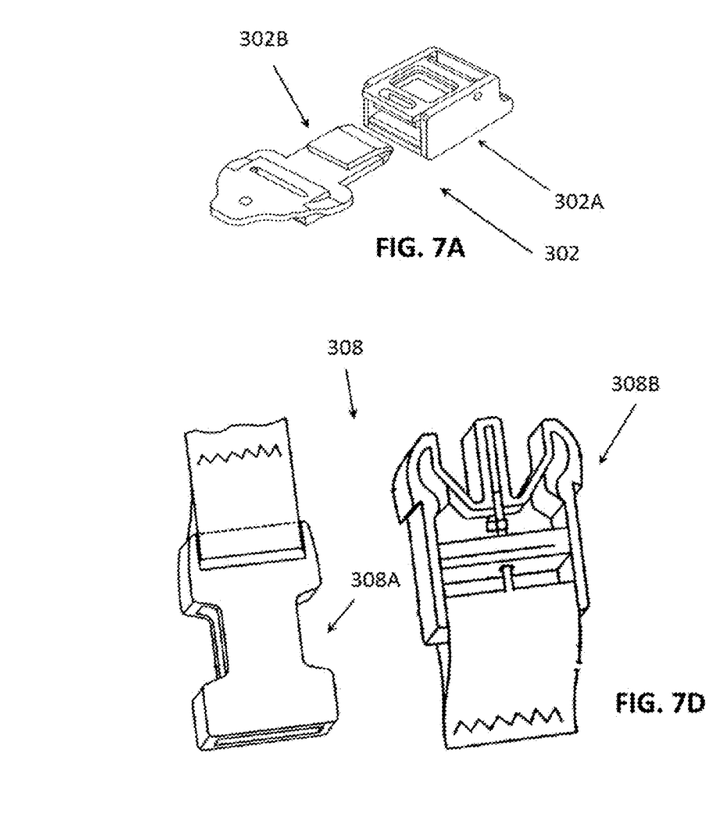
FIGS. 7A-7E illustrate non-limiting exemplary embodiments of quick-release buckles, each having a quick-disconnect socket and a tabbed section configured for removable attachment to each other.
Figure 7B:
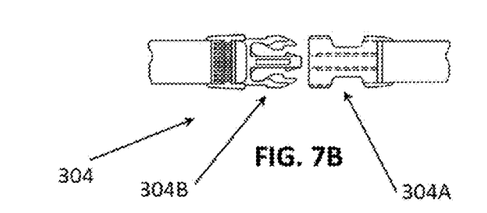
Figures 7C, 7E:
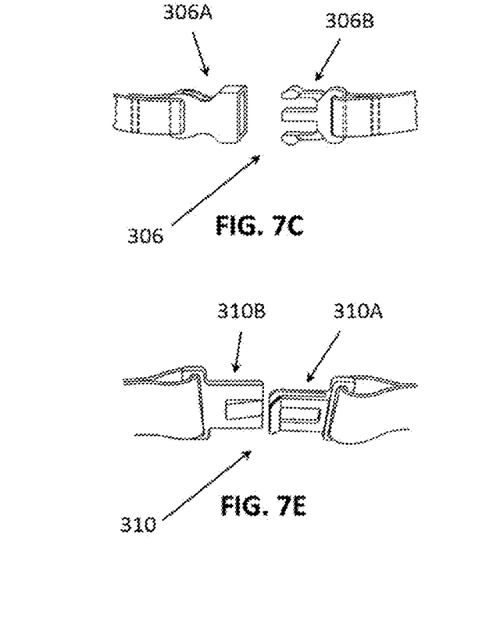

Once the equipment item 99 is inserted between the panels 202 and 206, the bottom front panel 208 is pulled forward beneath the equipment item 99 and upward in front of the equipment item. The bottom front panel 208 is attached to the top front panel 206 by any suitable fastener or closure mechanism (e.g., snap 210, hook-and-loop, magnet, and so on). In that closed arrangement, the panels 202, 206, and 208 enclose the equipment item in front, behind, above, and below and hold it in the holder 200. The equipment item 99 can be left exposed on the sides, thereby providing the user with access to grasp it while detaching the bottom front panel 208 from the top front panel 206 to release the equipment item 99 from the holder 200. In a non-limiting exemplary embodiment, for instance as illustrated in FIG. 6, the flexible bottom front panel 208 can comprise multiple substantially rigid segments 212, 214 connected by one or more flexible joints 216, or can comprise a single flexible sheet having no rigid portion at all.

Figure 8:
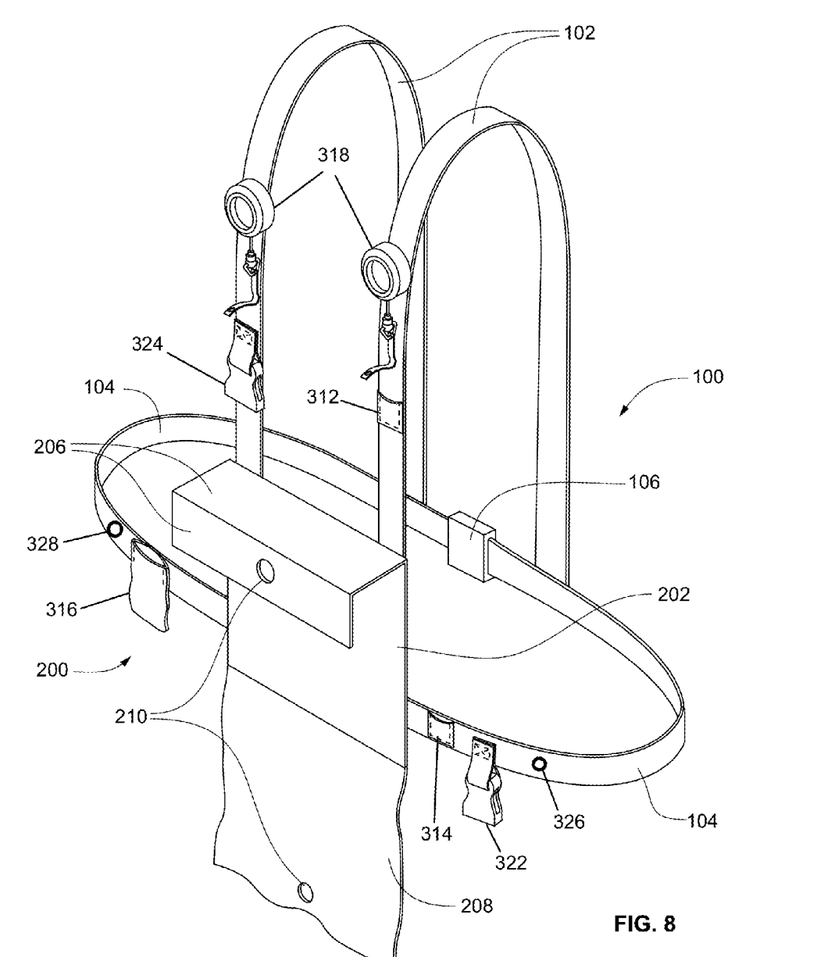
FIG. 8 illustrates a non-limiting exemplary embodiment of an equipment carrier having pockets, a pouch, quick-disconnect sockets, and retractable tethers.

Optionally, equipment carrier can include additional pockets, pouches, quick-detach sockets, or attachment points to carry other objects (in addition to the equipment item 99 in equipment holder 200). In a non-limiting exemplary embodiment, the quick-detach sockets are substantially similar to the socket of a quick-release buckle as are well known in the art. FIGS. 7A-7E illustrate exemplary quick-release buckles 302, 304, 306, 308, and 310 having complementary quick-disconnect sockets 302A, 304A, 306A, 308A, and 310A, and tabbed sections 302B, 304B, 306B, 308B, and 310B configured for releasable engagement with each other. Such pockets, pouches, sockets, or attachment points can be located anywhere suitable on the equipment holder 200, such as on back panel 202 or top front panel 206, or on the set 100 of support members 102/104 (or backpack, safety harness, etc.). FIG. 8 illustrates a non-limiting exemplary embodiment of an equipment carrier wherein one of the shoulder straps 102 includes a pocket 312 and the other shoulder strap 102 includes a quick-detach socket 324. Additionally, the waist strap 104 includes a pocket 314, a pouch 316, a quick-detach socket 322, and attachment points, for example grommets, eyelets, etc., 326 and 328. The locations of these components, viz., the pockets 312 and 314, the pouch 316, the quick-detach sockets 322 and 324, and the attachment points 326 and 328 as illustrated in FIG. 8 are to be considered as exemplary locations and should not be construed as limiting.

Figure 9A:
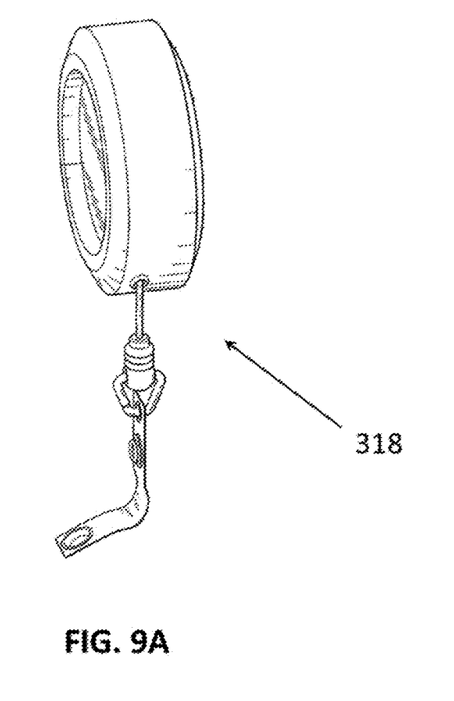
FIGS. 9A and 9B illustrate non-limiting exemplary embodiments of a retractable tether.
Figure 9B:
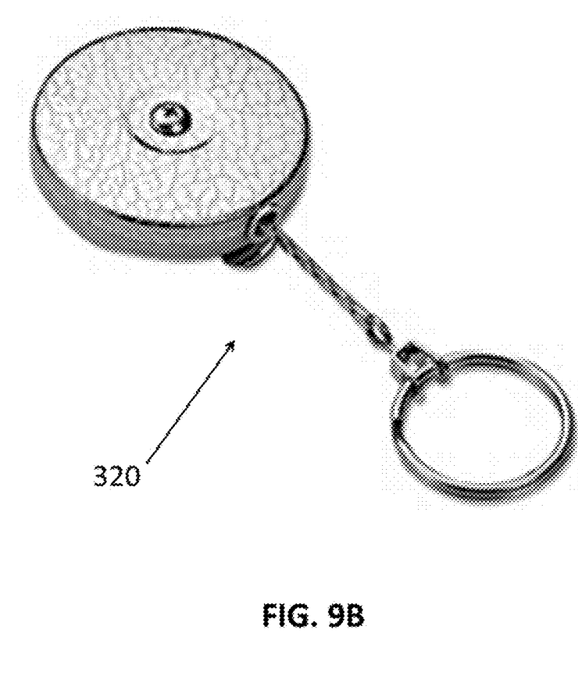

An extensible tether 300 can be attached in any suitable way to the equipment holder 200 or to the support members 102/104 (e.g., tied, stitched, stapled, tacked, riveted, glued, buckled, latched, clamped, secured by hook-and-loop, and so on). The extensible tether 300 can be arranged or adapted to be attached in any suitable way to the equipment item 99 (e.g., tied around the item, looped through an eyelet or similar structure on the item, attached to a case or sleeve for the item, attached to a mounting plate secured to the item, and so on). The tether 300 is provided, e.g., to prevent dropping of the equipment item 99 when it is removed from within the holder 200 (for example, to be used by the wearer). The extensible tether 300 can comprise an elastic material (e.g., shock or bungee cord, elastic polymer or other suitable elastic material) that has a desired rest length when under negligible tension but that can be lengthened when under tension. Alternatively, the extensible tether can comprise a retractable tether, e.g., on a spring-loaded spool or other suitable extension/retraction mechanism. Such mechanisms are well-known in the art in the form of badge holders, key holders, etc. An exemplary badge holder 318 and an exemplary key holder/chain 320 are illustrated in FIGS. 9A and 9B, respectively. Such a mechanism can be arranged to enable the tether to be extended under tension and to be retracted when that tension is sufficiently reduced, and can include a stop that prevents further retraction of the tether once it is retracted to a desired rest length. FIG. 8 illustrates a non-limiting exemplary embodiment of an equipment carrier wherein each shoulder strap 102 includes an extensible tether such as, for example, the badge holder 318. The locations of the extensible tethers, i.e., the badge holders 318, illustrated in FIG. 8 are to be considered as exemplary locations and should not be construed as limiting.

Figure 4:
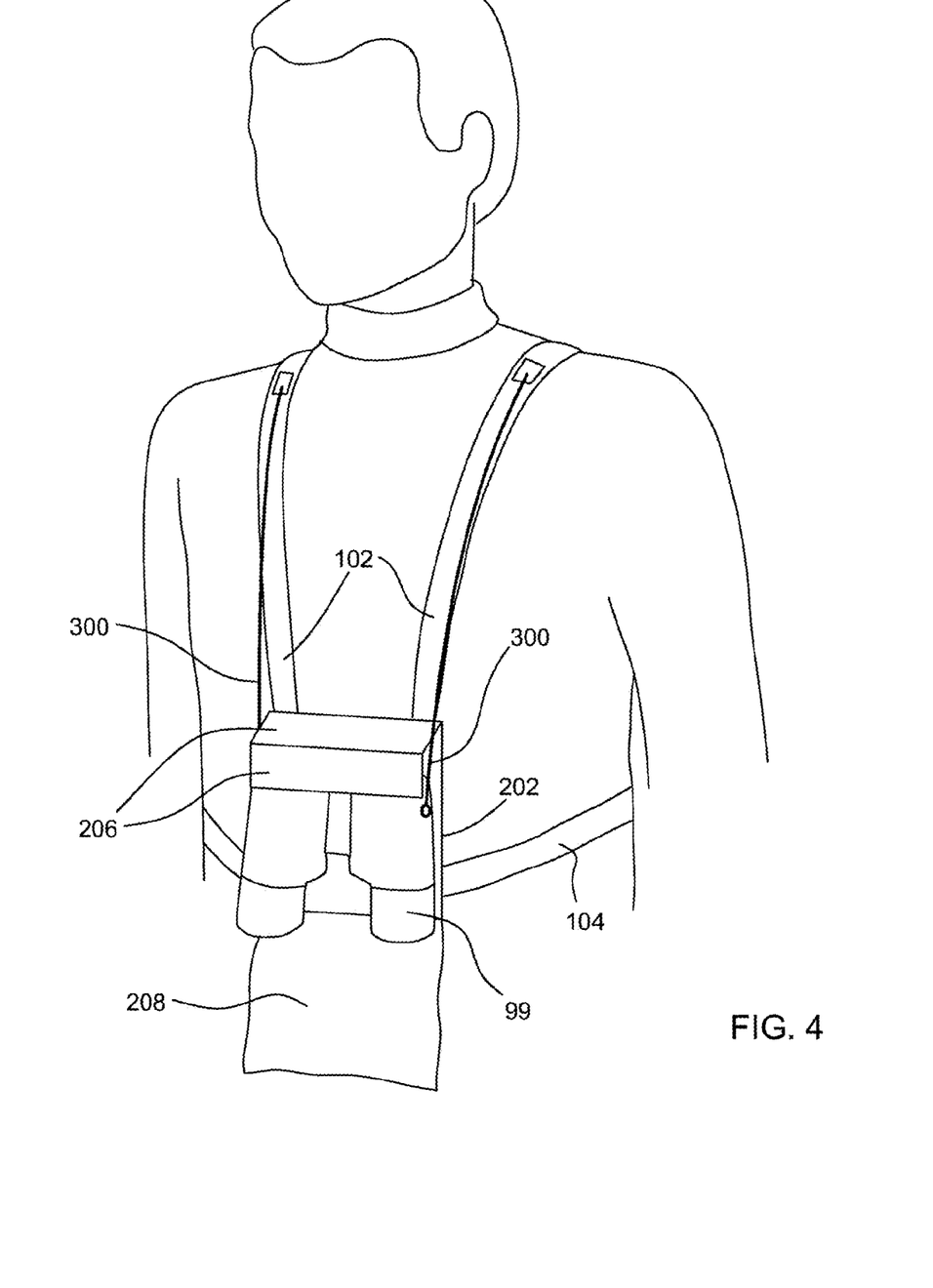
FIG. 4 illustrates schematically the equipment carrier being worn with an equipment item held in the holder.
Figure 5:
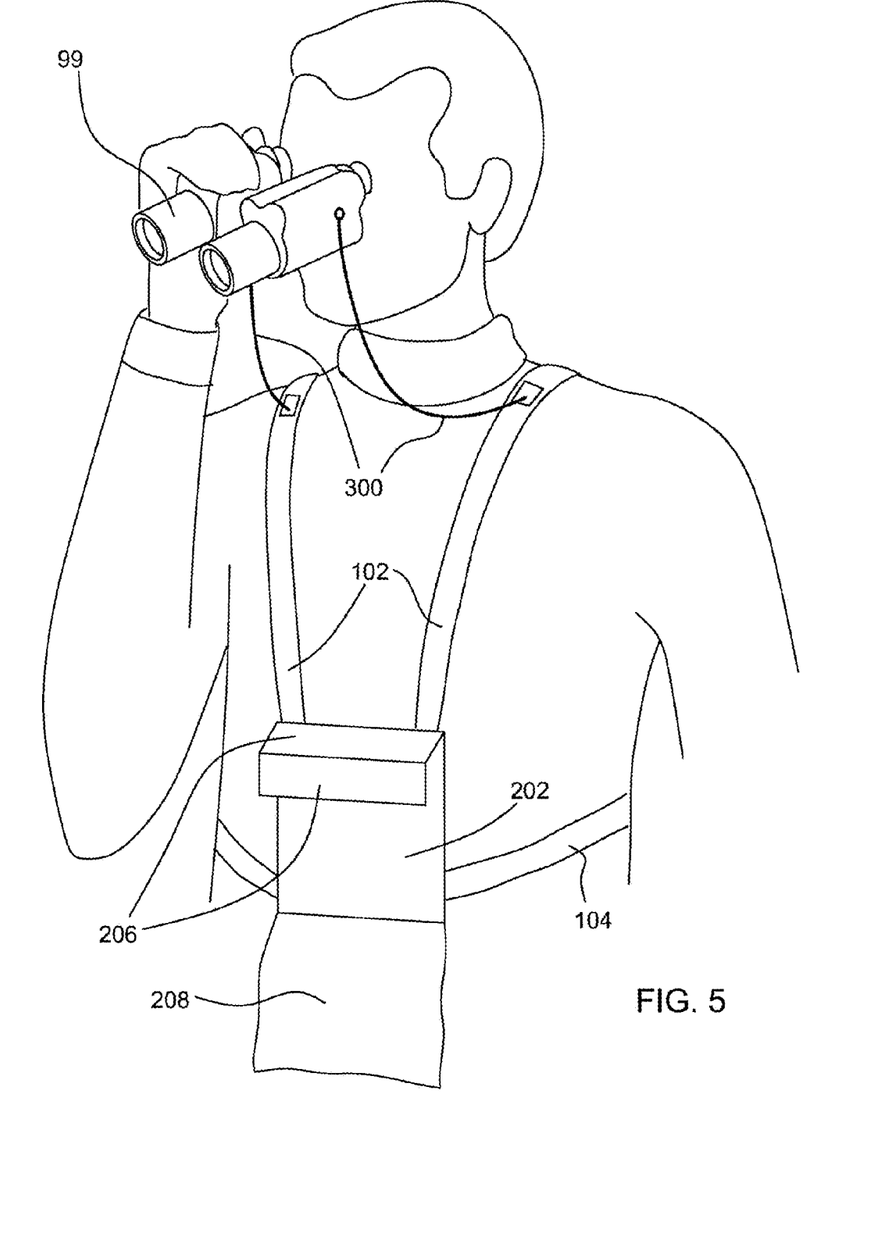
FIG. 5 illustrates schematically the equipment carrier being worn with the equipment item held at the wearer's eyes.

Whatever the specific arrangement of the extensible tether 300, the equipment holder 200, the one or more support members 102/104, and the tether 300 are arranged so that, (i) with the one or more support members supporting the equipment holder against the wearer's torso or limb, (ii) with the tether attached to the equipment item, and (iii) with the equipment item retained by the equipment holder, the extensible tether 300 is under tension and extended substantially beyond its rest length (as in FIG. 4). The one or more support members and the tether are further arranged so that, (i) with the one or more support members supporting the equipment holder against the wearer's torso or limb, (ii) with the tether attached to the equipment item, and (iii) with the equipment item held by the wearer at the wearer's face or head, the extensible tether is under negligible tension and not extended substantially beyond its rest length (as in FIG. 5).

The arrangement described in the previous paragraph provides several advantages. The elongation of and tension on the extensible tether 300 with the equipment item 99 held by the equipment holder 200 can serve to retain the equipment item 99 in the holder 200. For example, one advantageous arrangement includes attachment of the extensible tether 300 to one or more of the straps 102 at a point above the holder 200, so that tension on the tether 300 (elongated beyond its rest length) urges the equipment item 99 upward into the bracket formed by the back panel 202 and the top front panel 206 (as in FIG. 4). However, that arrangement also enables the equipment item 99 to be held at or near the wearer's face or head with the extensible tether 300 at its rest length and under negligible tension (as in FIG. 5). That is advantageous, for example, so as to allow the wearer to use the equipment (e.g., by holding binoculars or a camera in front of his eyes) without having to exert force against tension in the tether 300.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets of one or more features that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

The invention claimed is:

1. An equipment carrier, comprising:
   first and second shoulder straps;
   a waist strap connected to the first and second shoulder straps;
   an equipment holder; and
   first and second extensible tethers, wherein the first extensible tether is attached to the first shoulder strap, and the second extensible tether is attached to the second shoulder strap;
   wherein the equipment holder is attached to at least one of the first shoulder strap, the second shoulder strap, and the waist strap; and
   wherein, at least one of the first and second extensible tethers is attached to an equipment and
   wherein, tension resulting from elongation of the at least one of the first and second extensible tethers serves to retain the equipment within the equipment holder.

2. The equipment carrier of claim 1, wherein the equipment holder comprises a substantially rigid back panel and a substantially rigid top panel.

3. The equipment carrier of claim 2, wherein the substantially rigid back panel and substantially rigid top panel are elastically deformable.

4. The equipment carrier of claim 2, wherein the equipment holder further comprises a flexible front panel attached to the substantially rigid back panel.

5. The equipment carrier of claim 4, wherein the flexible front panel comprises a single flexible sheet.

6. The equipment carrier of claim 4, wherein the flexible front panel comprises two or more substantially rigid segments connected by flexible joints.

7. The equipment carrier of claim 4, comprising a fastener configured for attaching the flexible front panel and the top panel to each other.

8. The equipment carrier of claim 7, wherein the fastener comprises a snap, a hook-and-loop, or a magnet.

9. The equipment carrier of claim 1, wherein the first shoulder strap, the second shoulder strap, and the waist strap are each adjustable in length.

10. The equipment carrier of claim 1, wherein the first shoulder strap, the second shoulder strap, and the waist strap are comprised of nylon or canvas.

11. The equipment carrier of claim 1, wherein the first and second extensible tethers are comprised of an elastic material.

12. The equipment carrier of claim 11, wherein the first and second extensible tethers are comprised of bungee cord or elastic polymer.

13. The equipment carrier of claim 1, wherein the first and second extensible tethers are retractable tethers.

14. The equipment carrier of claim 13, wherein the retractable tethers can be extended under tension and retracted when the tension is sufficiently reduced.

15. The equipment carrier of claim 13, wherein the retractable tethers comprise spring-loaded spools.

16. The equipment carrier of claim 13, wherein each retractable tether comprises a stop that prevents retraction of the retractable tether when the retractable tether is at a desired rest length.

17. The equipment carrier of claim 1, wherein the first and second extensible tethers are respectively attached to the first and second shoulder straps at respective locations above the equipment holder.

18. The equipment carrier of claim 1, further comprising at least one of one or more pockets, one or more pouches, and one or more quick-detach sockets.

19. The equipment carrier of claim 18, wherein the at least one of the one or more pockets, the one or more pouches, and the one or more quick-detach sockets is located on at least one of the first shoulder strap, the second shoulder strap, and the waist strap.

* * * * *